United States Patent
Hayashi

(10) Patent No.: US 9,201,618 B2
(45) Date of Patent: Dec. 1, 2015

(54) IMAGE FORMING APPARATUS CAPABLE OF REPRODUCING USER SETTINGS, METHOD OF CONTROLLING THE SAME, AND STORAGE MEDIUM

(71) Applicant: CANON KABUSHIKI KAISHA, Tokyo (JP)

(72) Inventor: Tomonori Hayashi, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/550,029

(22) Filed: Nov. 21, 2014

(65) Prior Publication Data

US 2015/0153983 A1  Jun. 4, 2015

(30) Foreign Application Priority Data

Nov. 29, 2013 (JP) ................................. 2013-247634

(51) Int. Cl.
*G06F 3/12* (2006.01)
(52) U.S. Cl.
CPC ............ *G06F 3/1257* (2013.01); *G06F 3/1204* (2013.01); *G06F 3/1254* (2013.01)
(58) Field of Classification Search
USPC ........................................................ 358/1.15
See application file for complete search history.

(56) References Cited

U.S. PATENT DOCUMENTS

2009/0291551 A1\* 11/2009 Cho ............................... 438/585
2011/0096348 A1\* 4/2011 Ebi ............................... 358/1.14

FOREIGN PATENT DOCUMENTS

JP    2008273126 A    11/2008

OTHER PUBLICATIONS

Yosuke, Image Formation Device, Aug. 3, 2007, Machine Translated Japanese Patent Publication, JP 2007-055099, All Pages.\*

\* cited by examiner

*Primary Examiner* — Ngon Nguyen
(74) *Attorney, Agent, or Firm* — Rossi, Kimms & McDowell LLP

(57) ABSTRACT

A image forming apparatus having a plurality of applications, which is capable of properly reproducing settings desired by each user, and is thereby improved in user-friendliness. A storage controller stores a file with which first print settings can be associated. The storage controller stores second print settings in a manner associated with a user. An operation controller selects a file stored in association with the first print settings according to an instruction from a user who has logged into the image forming apparatus. A CPU executes print processing according to the first print settings when the first print settings are associated with the selected file, and on the other hand executes print processing according to the second print settings when the first print settings are not associated with the selected file.

6 Claims, 9 Drawing Sheets

FIG. 6

| USER IDENTIFIER 501 | COPY SETTING REPRODUCTION INFORMATION 502 | TRANSMISSION SETTING REPRODUCTION INFORMATION 503 | STORAGE SETTING REPRODUCTION INFORMATION 504 |
|---|---|---|---|
| A00001 | DOUBLE-SIDED PRINTING, FINISHER | - | 3 COPIES, BOOKBINDING LAYOUT |
| A00002 | - | DOUBLE-SIDED PRINTING, DESTINATION: 172.xx.xx.xx | - |
| - | - | - | - |

IMAGE FORMING APPARATUS CAPABLE OF REPRODUCING USER SETTINGS, METHOD OF CONTROLLING THE SAME, AND STORAGE MEDIUM

BACKGROUND OF THE INVENTION

1. Field of the Invention

The present invention relates to an image forming apparatus that is capable of reproducing user settings, a method of controlling the same, and a storage medium, and more particularly to an image forming apparatus that is equipped with a resume function for storing settings used when the image forming apparatus was used last time, and reproducing the stored settings when the image forming apparatus is used next time.

2. Description of the Related Art

In recent years, an image forming apparatus, such as a multifunction peripheral, has been equipped with various functions, such as a copy function, a facsimile function, a print function, and a network connection function, and operations to be performed by a user have become complicated. Particularly, an image forming apparatus installed in e.g. an office is often shared by a plurality of users, and hence, for example, if a user A has changed copy settings and then a user B uses the copy function without being aware of the changed settings, this may cause wasteful copy output instead of providing a printout desired by the user B. To solve this problem, there has been proposed an image forming apparatus equipped with an auto-clear function for automatically clearing the settings when a predetermined time period elapses after the settings are changed.

In a case where the settings are returned to the initial settings by the auto-clear function, a user is required to call up a desired setting screen from the initial menu screen of the image forming apparatus, and make the settings from the beginning. For this reason, even if settings usually used by a user are predetermined or fixed, the user has to make the same settings, which is troublesome to him/her. To solve the above-mentioned problem, there has been proposed a customization function for registering settings usually used by a user in advance, and calling up the registered settings when the user uses the image forming apparatus.

However, this function requires a user to customize the settings by himself/herself, and hence it is difficult for a user who is not familiar with the image forming apparatus to customize the settings. Therefore, a system is required which makes it possible to automatically reproduce a screen which was used by the user last time without requiring the user's instruction.

Conventionally, there has been proposed the following technique: When a plurality of functions are sequentially selected within a predetermined time period after user authentication, information on each of the functions and selection order thereof are stored in a manner associated with each user. Then, when customization information of the user is read from a customization information storage section, an initial display screen displayed for a function selected first (first ordinal rank) of the plurality of functions is read and displayed on a touch panel section (see e.g. Japanese Patent Laid-Open Publication No. 2008-273126). With this technique, a preference order of selections of functions is taken into consideration for each of a plurality of users, whereby it is possible to provide initial display screens appropriately customized on a user-by-user basis.

However, in the conventional technique disclosed in Japanese Patent Laid-Open Publication No. 2008-273126, each initial display screen is associated with a function selected first when the image forming apparatus was used last time. On the other hand, the recent image forming apparatuses are equipped with a plurality of applications.

In a box function which is provided by a storage application, an original is read and a file of a read image of the original is stored in a box. Afterwards, the user can print the file stored in the box, as required. Further, before printing, the user can designate print settings concerning output from the image forming apparatus, including page layout on a sheet, a finisher setting, such as stapling, and an image quality setting, such as density. Furthermore, by registering print settings for a file stored in the box, the user can eliminate an operation for making the print settings again when reprinting the file. However, in the image forming apparatus configured to have the box function, if the box function is displayed on the initial screen display and the print settings used when the image forming apparatus was used last time are restored on the display screen, even when the user intends to use a file different from the file in the box which was used last time, the print settings used last time are restored. In this case, the print settings different from those registered for the file which the user intends to use are sometimes restored, which requires the user to make the print settings again, and this means that the above-described conventional technique does not always contribute to improvement of user-friendliness.

SUMMARY OF THE INVENTION

The present invention provides an image forming apparatus having a plurality of applications, which is capable of properly reproducing settings desired by each user, and is thereby improved in user-friendliness.

In a first aspect of the present invention, there is provided an image forming apparatus comprising a first storage unit configured to store files with which first print settings can be associated, a second storage unit configured to store second print settings in a manner associated with a user, a selection unit configured to select one of the files stored by the first storage unit according to an instruction from the user who has logged into the image forming apparatus, and a control unit configured to execute print processing according to the first print settings when the first print settings are associated with the file selected by the selection unit, and execute print processing according to the second print settings when the first print settings are not associated with the file selected by the selection unit.

In a second aspect of the present invention, there is provided a method of controlling an image forming apparatus comprising storing files with which first print settings can be associated by a first storage unit, storing second print settings in a manner associated with a user by a second storage unit, selecting one of the files stored by the first storage unit according to an instruction from the user who has logged into the image forming apparatus, and executing print processing according to the first print settings when the first print settings are associated with the file selected by said selecting, and execute print processing according to the second print settings when the first print settings are not associated with the file selected by said selecting.

In a third aspect of the present invention, there is provided a non-transitory computer-readable storage medium storing a computer-executable program for executing a method of controlling an image forming apparatus, wherein the method comprises storing files with which first print settings can be associated by a first storage unit, storing second print settings in a manner associated with a user by a second storage unit, selecting one of the files stored by the first storage unit according to an instruction from the user who has logged into the image forming apparatus, and executing print processing according to the first print settings when the first print settings are associated with the file selected by said selecting, and execute print processing according to the second print settings when the first print settings are not associated with the file selected by said selecting.

According to the present invention, the image forming apparatus having a plurality of applications is capable of properly reproducing settings desired by each user, and is thereby improved in user-friendliness.

Further features of the present invention will become apparent from the following description of exemplary embodiments (with reference to the attached drawings).

BRIEF DESCRIPTION OF THE DRAWINGS

FIG. 6 is a diagram showing an example of data of the reproduction information.

DESCRIPTION OF THE EMBODIMENTS

The present invention will now be described in detail below with reference to the accompanying drawings showing embodiments thereof.

Figure 1:
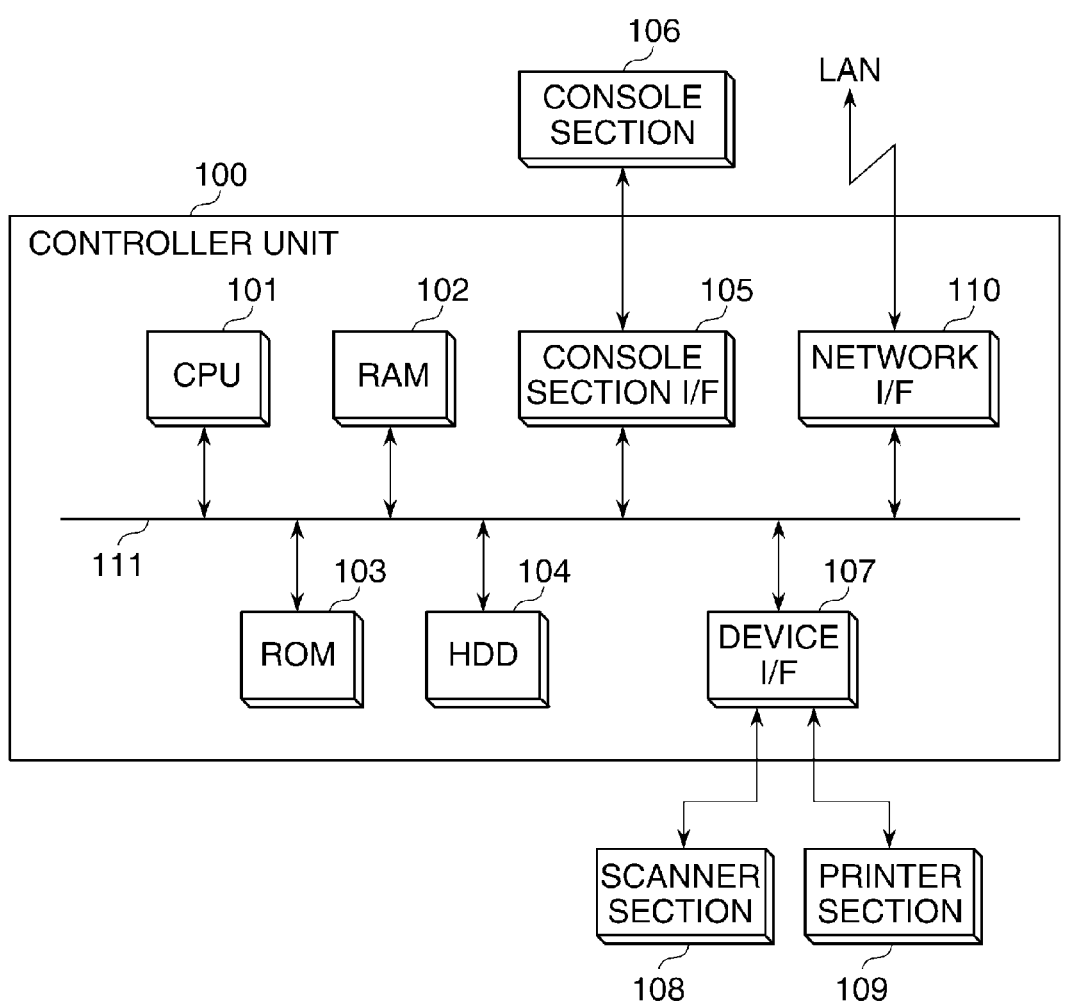
FIG. 1 is a block diagram of the hardware configuration of an image forming apparatus according to an embodiment of the present invention.

FIG. 1 is a block diagram of the hardware configuration of an image forming apparatus according to an embodiment of the present invention.

Referring to FIG. 1, the image forming apparatus is comprised of a controller unit 100, a console section 106, a scanner section 108, and a printer section 109.

The controller unit 100 includes components, described hereafter, and controls the overall operation of the image forming apparatus. A CPU 101, a RAM 102, a ROM 103, an HDD 104, a console section interface 105, a device interface 107, and a network interface 110 are connected to a system bus 111.

The CPU 101 is a central processing unit that controls the components connected to the system bus 111 in a centralized manner. The RAM 102 serves as a system work memory for the operation of the CPU 101, and also serves as an image memory for temporarily storing image data. Further, the RAM 102 stores an operating system (OS), system software, application software, and the like programs, and data.

The ROM 103 stores a boot program for the system. Further, the ROM 103 sometimes stores system programs, application programs, and information necessary for the image forming apparatus, such as fonts. The HDD (hard disk drive) 104 is a storage device storing the OS, the system software, the application software, image data, setting data, and so on.

The CPU 101 performs various control operations by reading programs stored in the ROM 103 or the HDD 104, loading the programs into the RAM 102, and executing the programs. Image data and data other than the image data, stored in the RAM 102, the ROM 103, and the HDD 104 are processed by the CPU 101. The image forming apparatus may have a configuration without a hard disk by storing the system software and the application software in the ROM 103 instead of having the HDD 104 installed therein. Further, a storage device other than the hard disk, such as an SSD (Solid State Disk) or a flash memory, can be employed in place of the HDD 104.

The console section interface 105 is connected to the console section 106. The console section 106 is a user interface (UI) for operating the image forming apparatus, including a display device, such as a touch panel, for notifying a user of the status of the image forming apparatus, and receiving operations from a user, and operation buttons for enabling the user to input instructions to the image forming apparatus.

The device interface 107 connects the scanner section 108 and the printer section 109, which are image input and output devices, to the controller unit 100, for input and output of image data. Image data input from the scanner section 108 via the device interface 107 is stored in the RAM 102 or the HDD 104. The stored image data is subjected to image processing using an application program stored in the RAM 102 on an as-needed basis. Further, when image data is output, similarly, the image data is output to the printer section 109 via the device interface 107. The network interface 110 is connected to a network, such as a LAN, outside the image forming apparatus, so as to input and output image data or information for controlling the image forming apparatus to and from external devices (not shown) on the network.

Figure 2:
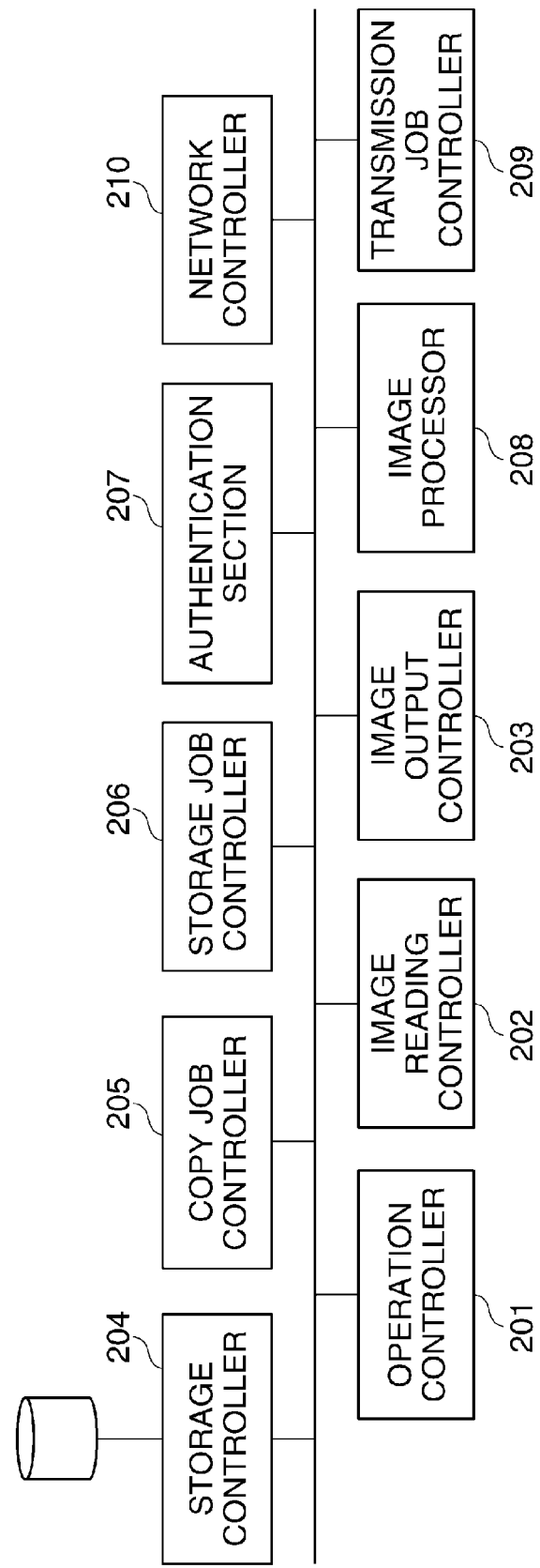
FIG. 2 is a block diagram of the software configuration of the image forming apparatus shown in FIG. 1.

FIG. 2 is a block diagram of the software configuration of the image forming apparatus shown in FIG. 1. In the following description, it is assumed that the CPU 101 operates a program for controlling the image forming apparatus through centralized control of the components shown in FIG. 2.

First, a copy operation executed by the image forming apparatus will be described.

The scanner section 108 includes a platen and an automatic document feeder (ADF), neither of which is shown. When a user places an original on the platen or on the ADF and presses an original reading start button (not shown) on the console section 106, the scanner section 108 optically reads an image from the original placed on the platen or the ADF. In a case where the scanner section 108 reads a plurality of originals, when the platen is used, reading is continually executed by replacing one original set thereon with another, whereas when the ADF is used, reading is continually executed by sequentially feeding the originals from the ADF. Before this, the user can designate print settings concerning output from the image forming apparatus, including page layout on a sheet, a finisher setting, such as stapling, and an image quality setting.

An operation controller 201 displays on the console section 106 a screen and information necessary for operating the console section 106, and receives information input by an operation performed by a user on the console section 106 to determine which operation is instructed by the user. When a copy instruction is received from the user, the operation controller 201 generates a screen (copy screen) necessary for copy printing, and instructs the console section 106 to display the generated screen. This causes the screen for copy printing to be displayed on the console section 106, and in response to this, the user sets an original on the platen or the ADF, and instructs copying. Before this instruction, the user may designate the above-mentioned print settings.

The copy instruction is passed from the console section 106 to the operation controller 201. The operation controller 201 determines that the received instruction is a copy instruction, and passes the copy instruction to a copy job controller 205.

It is required in the first place to read an image from the original, and hence the copy job controller 205 instructs an image reading controller 202 to read the image. The image reading controller 202 controls the scanner section 108 via the device interface 107 to read the image on the original set on the platen or fed from the ADF. Note that in a case where the original on the platen is replaced by another, the control is returned from the copy job controller 205 to the operation controller 201, and the operation controller 201 displays again on the console section 106 a screen for prompting the user to select between reading the next original or starting printing.

A storage controller 204 stores the data read by the scanner section 108 in the RAM 102 or the HDD 104 via the device interface 107 and the system bus 111. Note that in which of the RAM 102 and the HDD 104 the data is to be stored is determined by the image reading controller 202 depending on factors, such as data size and whether or not high-speed processing is required.

Next, it is required to output the read data, and hence the copy job controller 205 instructs an image output controller 203 to print the image data stored by the storage controller 204.

The image output controller 203 instructs an image processor 208 to perform image processing on the image data stored by the storage controller 204 according to the print settings designated by the user. Image processing is e.g. editing of an image to be output, such as laying out images on respective two originals on one sheet (2in1).

When editing of the image to be output is completed, the image processor 208 stores the edited image data in the RAM 102 or the HDD 104 by the storage controller 204.

The image output controller 203 reads the edited image data from the RAM 102 or the HDD 104 by the storage controller 204, and transfers the data to the printer section 109 via the system bus 111 and the device interface 107. The printer section 109 sequentially prints out the received image data onto sheets.

Next, an authentication section 207 that performs authentication will be described.

In the image forming apparatus, user authentication is sometimes required according to a function to be used. For example, a screen for prompting the user to input a user name and a password is displayed on the console section 106, whereby the user is prompted to input the user name and the password. When the user name and password have been input, the user name and password input to the console section 106 are sent to the authentication section 207 via the console section interface 105.

The authentication section 207 performs user authentication by referring to a user database (not shown) stored e.g. in the HDD 104, and checking whether or not the user database contains a combination of a user name and a password matching the input user name and password. Note that user authentication is not limited to this, but any other authentication method may be employed, such as one using a contactless IC card. Further, authentication information is not necessarily required to be locally held (in the image forming apparatus), but authentication may be performed using an external authentication server (not shown), as in the case of Active Directory (registered trademark of Microsoft). In such a case, the authentication section 207 makes an inquiry to the external authentication server.

Next, screens displayed on the console section 106 of the image forming apparatus will be described with reference to FIGS. 3A, 3B, and 4.

Figure 3A:
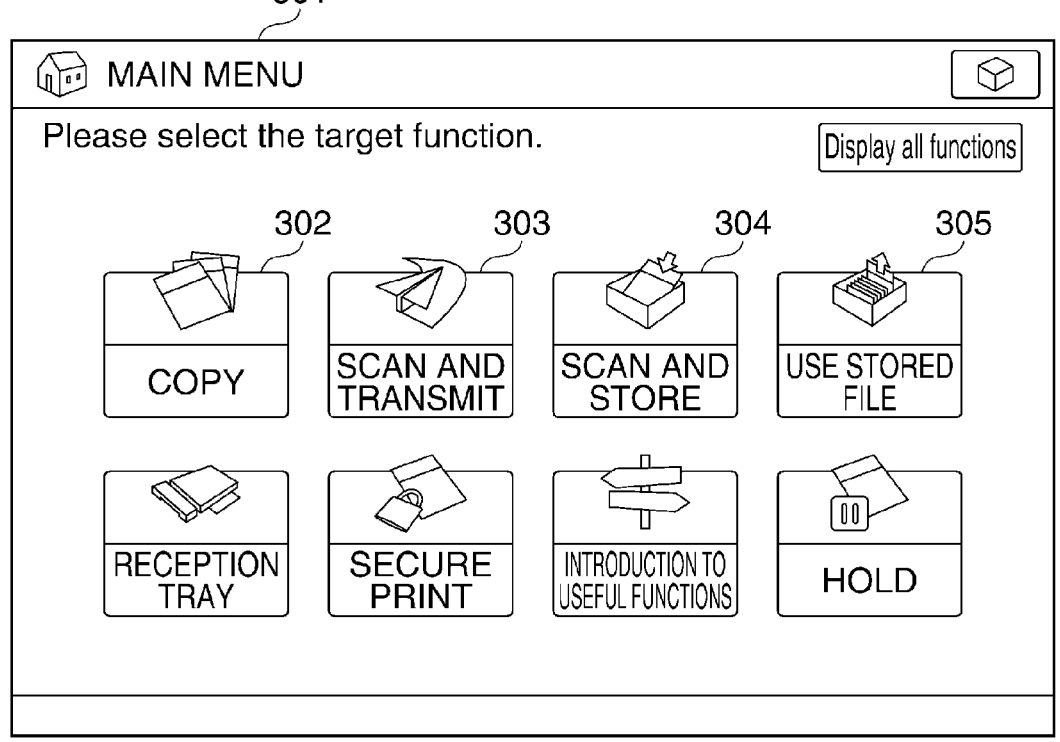
FIG. 3A is a diagram showing an example of a main menu screen displayed on a console section of the image forming apparatus.
Figure 3B:
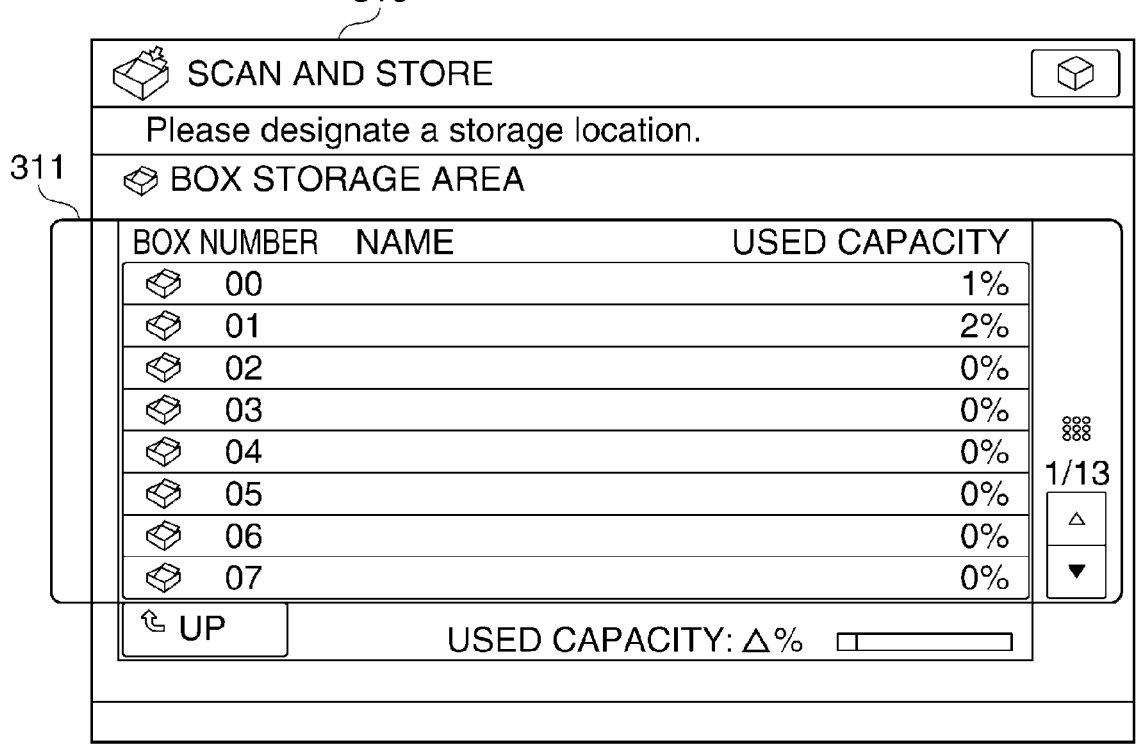
FIG. 3B is a diagram showing an example of a scan-and-store screen displayed on the console section of the image forming apparatus.
Figure 4:
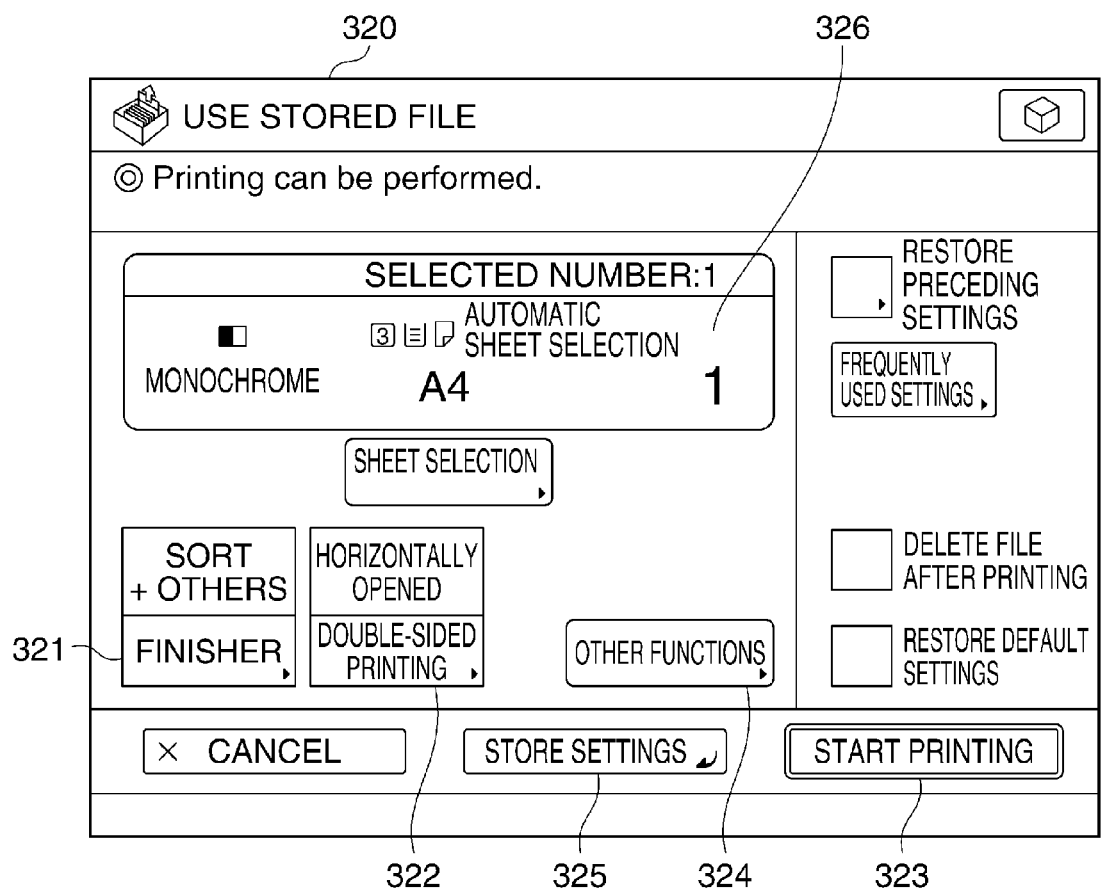
FIG. 4 is a diagram showing an example of a stored file usage screen displayed on the console section of the image forming apparatus.

FIGS. 3A, 3B, and 4 are diagrams showing examples of the screen displayed on the console section 106, respectively.

Referring to FIG. 3A, a main menu screen 301 is an initial screen displayed when the image forming apparatus is powered on. The main menu screen 301 has a copy application selection key 302 disposed thereon, for selection by the user so as to shift to the copy screen. Further, the main menu screen 301 has a transmission application selection key 303 disposed thereon, for selection by the user so as to shift to a transmission screen.

Further, the main menu screen 301 has a storage application selection key 304 disposed thereon, for selection by the user so as to shift to a scan-and-store screen. The storage application is an application for causing the storage controller 204 to store image data input from the scanner section 108 of the image forming apparatus in the HDD 104 via the device interface 107, and printing the stored image data. When the storage application selection key 304 is selected, the screen is shifted to the scan-and-store screen, denoted by reference numeral 310, shown in FIG. 3B. Note that in FIG. 3A, description of various keys which are not denoted by reference numerals is omitted.

In FIG. 3B, the scan-and-store screen 310 has a box display area 311 disposed thereon, for selection of a destination to store image data. When one of boxes displayed on the box display area 311 is selected, image data read from an original by the scanner section 108 is stored in the selected box. When a key for reading a file is pressed after the box is selected by the user, the screen is shifted to a storage setting screen (not shown).

To print image data stored in the box, a file of the image data is selected, and then the screen is returned to the main menu screen 301, whereafter a stored file usage selection key 305 is pressed. By pressing the stored file usage selection key 305, the screen is changed to a stored file usage screen 320 shown in FIG. 4.

In FIG. 4, the stored file usage screen 320 is a screen for making print settings to be used for printing a file of the image data stored in the box. The user can make print settings for printout, including settings of page layout on a sheet, settings of a finisher operation, such as stapling, and settings of image quality, such as density, on the stored file usage screen 320. In the illustrated example, keys selected for settings are displayed in reverse video.

On the stored file usage screen 320, a double-sided printing key 322 is used to set the double-sided printing mode. In the illustrated example, it is shown that the double-sided printing mode has been set. A finisher key 321 is used to set a mode concerning sorting or stapling. In the illustrate example, it is shown that the finisher mode has been set. When the number of copies is set by inputting a value using e.g. numeric keys, not shown, on the console section 106, the set number of copies is displayed on a print copy number display 326. In the illustrate example, the number of copies is set to 1.

By using an other-function key 324, the user can designate other print settings, such as page layout on a sheet. If a printing start key 323 is touched in this state, it is determined that starting the job is instructed, and a storage job controller 206 reads out a file of the image data stored in the RAM 102 or the HDD 104 using the storage controller 204 and executes printing according to the set print settings.

A setting storing key 325 is a key used to store the settings, and by pressing the setting storing key 325, the print settings designated on a print setting screen can be registered in a manner associated with a file to be printed. For example, on the stored file usage screen 320 shown in FIG. 4, the finisher mode and the double-sided printing mode have been set. If the setting storing key 325 is touched in this state, the finisher mode and the double-sided printing mode are registered in a manner associated with the selected file to be printed. After the print settings have been registered, if the corresponding file is selected on the console section 106 and the screen is shifted to the print setting screen, the registered print settings are restored and displayed in reverse video. Note that the other setting modes, shown in FIG. 4, can be set similarly to the above-mentioned finisher mode and the double-sided printing mode, and detailed description thereof is omitted.

Figure 5:
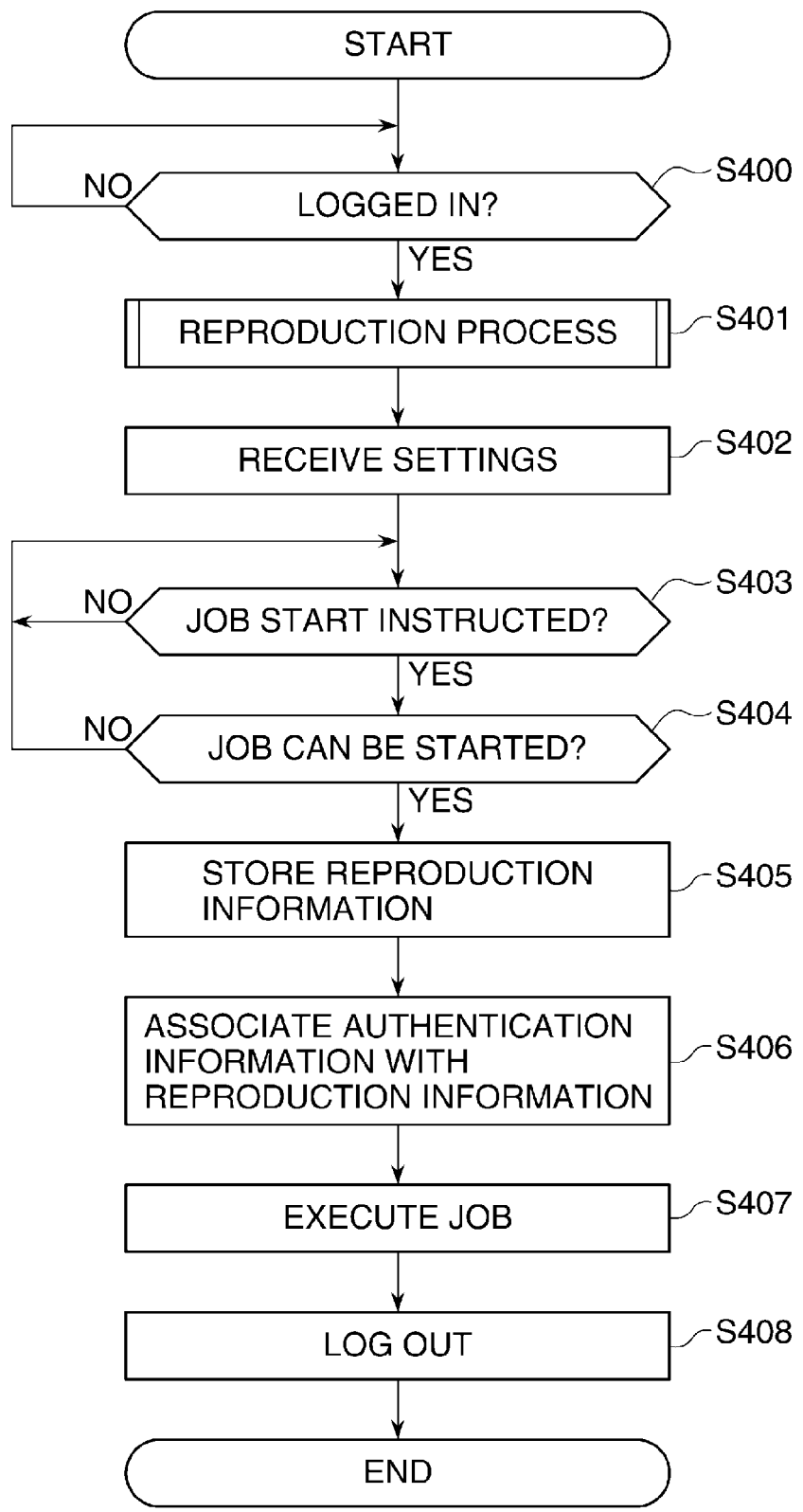
FIG. 5 is a flowchart of a process for storing reproduction information necessary for reproducing settings of the image forming apparatus.

FIG. 5 is a flowchart of a process for storing reproduction information necessary for reproducing the settings of the image forming apparatus. The process in FIG. 5 is performed by causing the CPU 101, the RAM 102, the ROM 103, the HDD 104, and so forth to cooperate with each other, and thereby function as the operation controller 201, the authentication section 207, and the storage controller 204. In other words, the process is realized by the CPU 101 which reads and executes a program stored in the HDD 204 or the ROM 103.

Referring to FIG. 5, in a step S400, the authentication section 207 executes user authentication processing (log-in processing). If the user logs into the image forming apparatus through successful authentication, the process proceeds to a step S401.

In the step S401, if the reproduction information has already been stored, a reproduction process for reproducing the settings is performed, and the application screen is displayed. The reproduction process in the step S401 will be described in detail with reference to FIG. 8.

Next, in a step S402, the operation controller 201 receives print settings and original reading settings input from the application screen.

In a step S403, the operation controller 201 determines whether or not the start of the job is instructed. If it is determined that the start of the job is instructed, the process proceeds to a step S404. The start of the job indicates a state in which as described hereinbefore with reference to FIG. 4, when a start key (not shown) is pressed on an application screen, a job controller of an associated application starts its operation according to set information.

In the step S404, the operation controller 201 identifies an application for which the start of the job is designated and determines whether or not settings made for the identified application are those with which the job can be started. In a case where the operation controller 201 is configured in advance to make it impossible to set any combination of settings with which a job cannot be executed, if only it is possible to issue an instruction for starting a job, the operation controller 201 can determine that the job can be executed without exception.

Alternatively, the job controller of the application identified in the step S404 may determine whether or not the job can be started according to the settings having been made. The job controller mentioned here indicates the copy job controller 205, the storage job controller 206, and a transmission job controller 209. If it is determined in the step S404 that the job can be started, the process proceeds to a step S405.

In the step S405, the operation controller 201 stores the settings (second print settings) made for the application identified in the step S404 in the RAM 102 or the HDD 104 using the storage controller 204 as the reproduction information of this application.

In a step S406, the storage controller 204 associates the authentication information (user identifier) used in the step S401 and the reproduction information stored in the step S405 with each other, and stores the association information in the RAM 102 or the HDD 104. For example, in a case where the application is the storage application, if the settings are those on the stored file usage screen 320 shown in FIG. 4, the double-sided printing mode and the finisher mode are stored as the reproduction information. If the reproduction information of the same application of the user has already been stored in the RAM 102 or the HDD 104 by the storage controller 204 at this time point, the latest reproduction information is stored.

In a step S407, the job controller of the application identified in the step S404 executes the job according to the settings having been made.

Further, although in the present process, the reproduction information is stored at the start of the job, the reproduction information can be stored at another timing, such as when an operation for changing the application of the image forming apparatus is performed.

In a step S408, when a log-out instruction is received through termination of the use of the image forming apparatus by the user, the operation controller 201 shifts to a screen for waiting for a log-in operation, followed by terminating the present process.

FIG. 6 is a diagram showing an example of data of the reproduction information.

Referring to FIG. 6, the reproduction information data is composed of a user identifier 501 of a log-in user and the reproduction information of each application of the log-in user. The reproduction information is stored in the RAM 102 or the HDD 104 by the storage controller 204.

The user identifier 501 is information for uniquely identifying a log-in user, which is a value set to be different on a user-by-user basis.

Copy setting reproduction information 502 indicates the reproduction information of a copy application. In the illustrate example, it is shown as the copy setting reproduction information 502 of a user identifier A00001 that the double-sided printing mode and the finisher mode have been stored. Further, in the illustrated example, it is shown that the copy setting reproduction information 502 of a user identifier A00002 has not been stored yet.

Transmission setting reproduction information 503 indicates the reproduction information of a transmission application. In the illustrate example, it is shown as the transmission setting reproduction information 503 of the user identifier A00002 that the double-sided printing mode and a destination have been stored.

Storage setting reproduction information 504 indicates the reproduction information of the storage application. In the illustrate example, the storage setting reproduction information 504 of the user identifier A00001 shows "3 copies", which indicates that the number of copies is set to 3, and "bookbinding layout", which indicates that the setting of the layout on a sheet has been stored for a bookbinding mode.

Although the copy setting reproduction information 502, the transmission setting reproduction information 503, and the storage setting reproduction information 504, shown in FIG. 6, store only information different from the initial settings, all information including the initial settings may be stored.

Next, description will be given of a process for registering print settings in a file of a box by the box function which is provided by a storage application.

Figure 7:
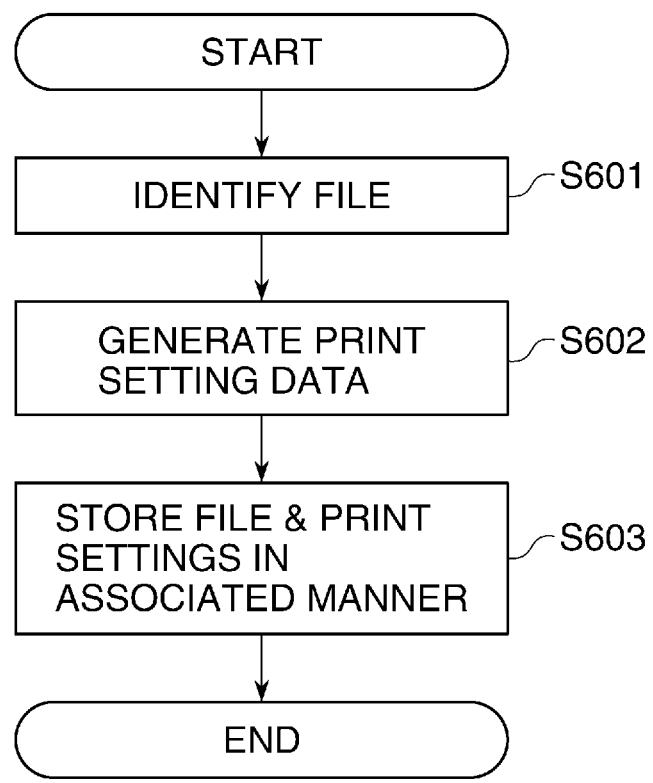
FIG. 7 is a flowchart of a process for registering print settings for a file stored in a box by using a box function which is provided by a storage application.

FIG. 7 is a flowchart of the process for registering print settings for a file stored in a box by using the box function which is provided by the storage application. The process in FIG. 7 is performed by causing the CPU 101, the RAM 102, the ROM 103, the HDD 104, and so forth to cooperate with each other, and thereby function as the operation controller 201, the storage controller 204, the storage job controller 206, and a network controller 210. In other words, the process is realized by the CPU 101 which reads and executes a program stored in the HDD 104 or the ROM 103.

As a method of registering print settings, there may be used a method using the print setting screen described with reference to FIG. 4 or a method using data transmitted from a host computer, not shown. The registration process in the present embodiment can be applied to both of the methods.

In a step S601, the storage job controller 206 identifies a file stored in a box by the storage controller 204.

In a step S602, the storage job controller 206 interprets a command transmitted from the network controller 210 or the operation controller 201, and generates print setting data. More specifically, if the storage job controller 206 determines that the finisher setting for stapling is included in the command, the storage job controller 206 generates staple settings (whether or not stapling is to be performed, staple positions, etc.) in an interpretable data format as the print setting data.

In a step S603, the storage job controller 206 stores the print setting data (first print settings) generated in the step S602 in the RAM 102 or the HDD 104, using the storage controller 204, in a manner associated with the file identified in the step S601, followed by terminating the present process.

Figure 8:
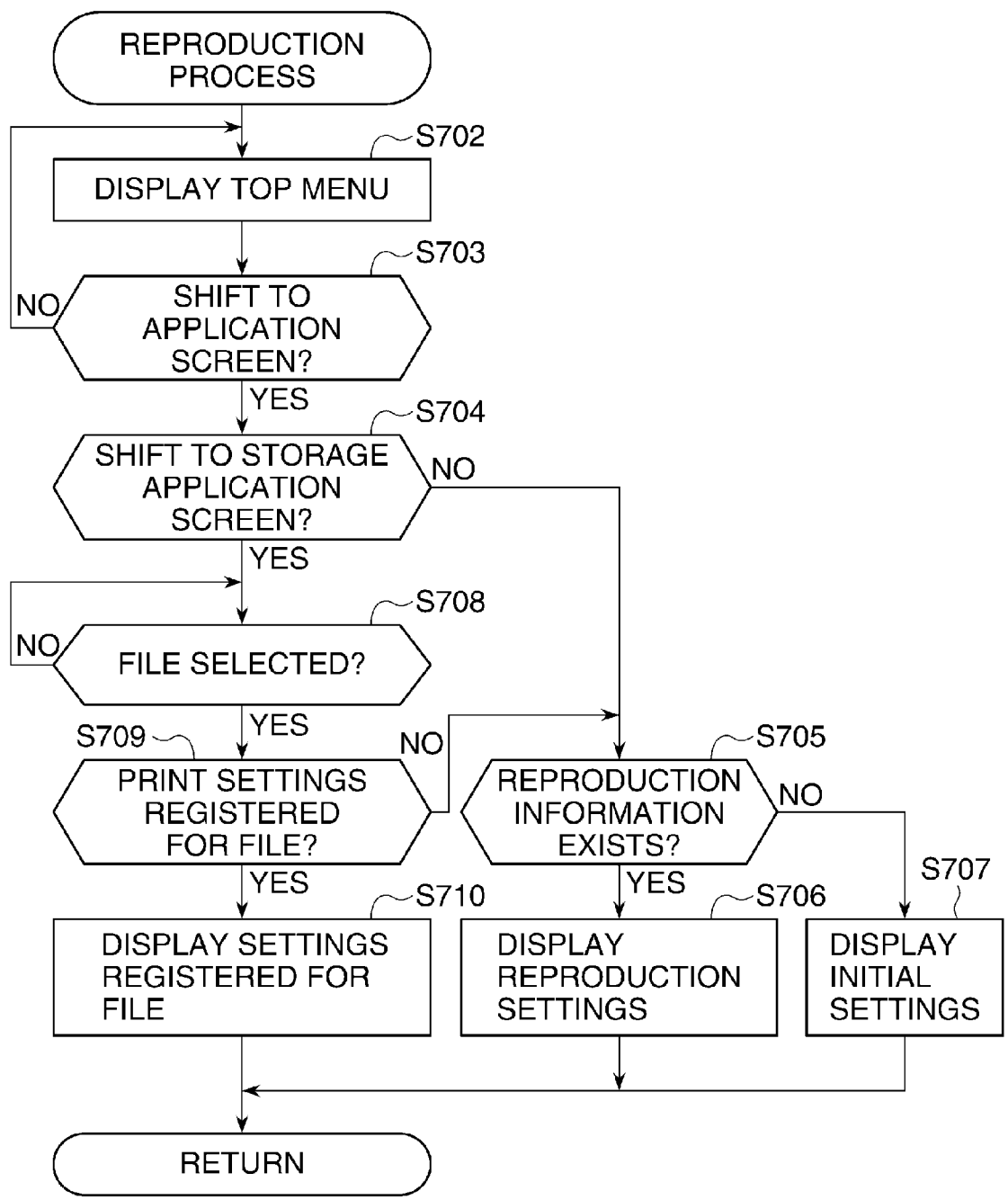
FIG. 8 is a flowchart of a reproduction process for reproducing the settings of the image forming apparatus, which is performed in a step in FIG. 5.

FIG. 8 is a flowchart of the reproduction process for reproducing the settings of the image forming apparatus, which is performed in the step S401 in FIG. 5. The reproduction process in FIG. 8 is performed by causing the CPU 101, the RAM 102, the ROM 103, the HDD 104, and so forth to cooperate with each other, and thereby function as the operation controller 201, the authentication section 207, and the storage controller 204. In other words, the process is realized by the CPU 101 which reads and executes a program stored in the HDD 104 or the ROM 103.

If the user logs into the image forming apparatus through successful authentication in the step S400 in FIG. 5, in a step S702, the operation controller 201 displays the main menu screen shown in FIG. 3A.

In a step S703, the operation controller 201 determines whether or not an instruction for displaying an application screen has been received from the user. If it is determined that the instruction has been received, the process proceeds to a step S704.

In the step S704, the operation controller 201 determines whether or not the application screen designated for display by the display instruction in the step S703 is a screen of the storage application. If it is determined that the display of the screen of the storage application has been designated, the process proceeds to a step S708, whereas if it is determined that display of a screen of another application is designated, the process proceeds to a step S705.

In the step S705, the operation controller 201 determines whether or not there is reproduction information, stored in the RAM 102 or the HDD 104 using the storage controller 204, which matches the user identifier of the user who has logged into the image forming apparatus in the step S701. If it is determined that the matching reproduction information exists, the operation controller 201 determines whether or not there is reproduction information stored in a manner associated with the application for which the display of the screen was designated by the display instruction in the step S703. If it is determined that the corresponding reproduction information exists, the process proceeds to a step S706, whereas if not, the process proceeds to a step S707.

In the step S706, the operation controller 201 reads the reproduction information detected in the step S705 from the RAM 102 or the HDD 104 stored therein by the storage controller 204, and reproduces the read information on the application screen designated in the step S703. As a consequence, it is possible to automatically reproduce the screen which was used last time without a user's instruction.

On the other hand, in the step S707, since it is determined that the corresponding reproduction information does not exist, the operation controller 201 displays the application screen designated in the step S703 with the initial settings.

If it is determined in the step S704 that the display of the screen of the storage application has been designated, in the step S708, the operation controller 201 determines whether or not the file to be printed, stored in the box of the storage application, is selected, and if it is determined that the corresponding file is selected, the process proceeds to a step S709.

In the step S709, the operation controller 201 determines whether or not the print settings have been registered in association with the file selected in the step S708. The operation controller 201 reads the print settings of the file selected in the step S708 from the RAM 102 or the HDD 104 using the storage controller 204, and if it is determined that the print settings have been registered, the process proceeds to a step S710, whereas if not, the process proceeds to the step S705.

In the step S710, the operation controller 201 reads the print settings of the file selected in the step S708 from the RAM 102 or the HDD 104 using the storage controller 204, and reproduces the read settings on the storage application screen. This makes it possible to reproduce the print settings of the file. As an example, a case where the reproduction information as shown in FIG. 6 has been held will be described. It is assumed here that the user corresponding to the user identifier A00001 has logged into the image forming apparatus in the step S400 in FIG. 5, and a shift to the storage application screen has been designated in the step S703 in FIG. 8. In a case where the print settings for the double-sided printing mode and the finisher mode have been registered in association with the selected file to be printed as shown in FIG. 4, a screen on which the print settings shown in FIG. 4 are selected is reproduced. In a case where the print settings have not been registered in association with the selected file to be printed, a screen on which the print settings of "three copies" and "bookbinding layout", as the storage setting reproduction information of the user identifier A00001, shown in FIG. 6, are selected is reproduced.

In the reproduction process in FIG. 8, as for a file for which the print settings have been registered, the registered print settings are unconditionally restored. However, it is also possible to cause a user to select between "the print settings registered in association with the file" or "the print settings used in immediately preceding use of the image forming apparatus". The details of display on the console section in this case will be described with reference to FIG. 9.

Figure 9:
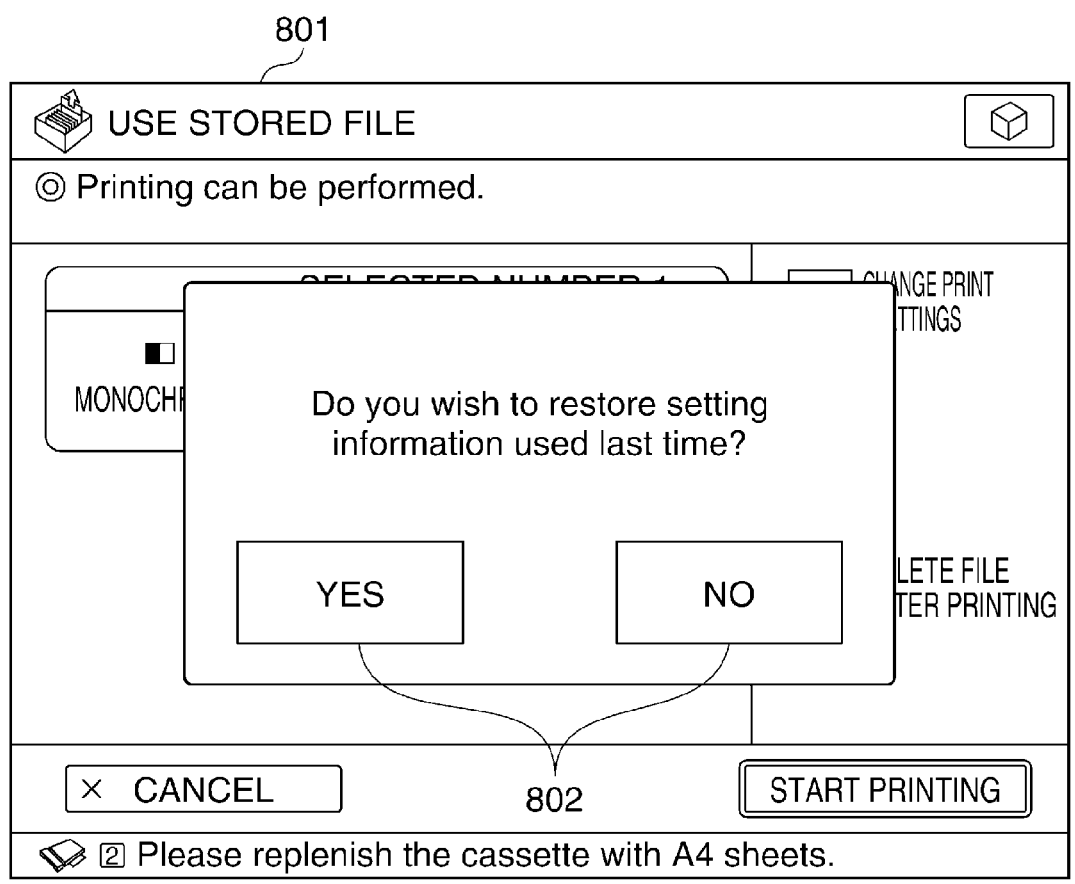
FIG. 9 is a diagram showing an example of a screen displayed on the console section, which makes it possible to perform conditional restoration of the settings.

In FIG. 9, reference numeral 801 denotes the print setting screen of the storage application. Reference numeral 802 denotes selection keys for selecting a settings restoration method, and when "Yes" is selected, the reproduction information shown in FIG. 6 is restored, which is "the print settings used in immediately preceding use of the image forming apparatus". On the other hand, when "No" is selected, the print settings registered in association with the file to be printed in the box are restored, and the print setting screen (e.g. the stored file usage screen 320) is displayed.

Although in the illustrated example, the user is prompted to select the print settings to be restored before restoration of the print settings, one of "the print settings registered in association with the file" and "the print settings used in immediately preceding use of the image forming apparatus" may be once restored, for a change to be made thereafter, if required, to the other.

As descried above, according to the present embodiment, the user information of a user who has logged into the image forming apparatus and the setting information provided for each application are stored as the reproduction information in a manner associated with each other. It is determined whether or not setting information has been stored in association with a file selected by the user, and if it is determined that the setting information has been stored in association with the file, the setting information associated with the file is read and reproduced. On the other hand, if it is determined that the setting information has not been stored in association with the file, the setting information associated with the user information of the log-in user is read from the reproduction information and reproduced. This makes it possible to properly reproduce the settings desired by the user who uses the image forming apparatus, and thereby improve the user-friendliness.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247634 filed Nov. 29, 2013, which is hereby incorporated by reference herein in its entirety.

What is claimed is:

1. An image forming apparatus comprising:
   a processor connected to a memory;
   a first storage unit configured to store files with which first print settings can be associated;
   a second storage unit configured to store second print settings in a manner associated with a user;
   the processor and memory being configured to:
   select one of the files stored by said first storage unit according to an instruction from the user who has logged into the image forming apparatus; and
   execute print processing according to the first print settings when the first print settings are associated with the selected file, and execute print processing according to the second print settings when the first print settings are not associated with the selected file.

2. The image forming apparatus according to claim 1, wherein when the first print settings are associated with the selected file, it is made possible to switch whether to use the first print settings or the second print settings.

3. The image forming apparatus according to claim 1, wherein when print settings corresponding to the log-in user have not been stored by said second storage unit, initial settings are displayed.

4. The image forming apparatus according to claim 1, wherein said second storage unit stores the print settings, at a timing including the start of a job or execution of an operation for changing an application.

5. A method of controlling an image forming apparatus comprising:
   storing files with which first print settings can be associated by a first storage unit;
   storing second print settings in a manner associated with a user by a second storage unit;
   selecting one of the files stored by the first storage unit according to an instruction from the user who has logged into the image forming apparatus; and
   executing print processing according to the first print settings when the first print settings are associated with the file selected by said selecting, and execute print processing according to the second print settings when the first print settings are not associated with the file selected by said selecting.

6. A non-transitory computer-readable storage medium storing a computer-executable program for executing a method of controlling an image forming apparatus,
   wherein the method comprises:
   storing files with which first print settings can be associated by a first storage unit;
   storing second print settings in a manner associated with a user by a second storage unit;
   selecting one of the files stored by the first storage unit according to an instruction from the user who has logged into the image forming apparatus; and executing print processing according to the first print settings when the first print settings are associated with the file selected by said selecting, and execute print processing according to the second print settings when the first print settings are not associated with the file selected by said selecting.

* * * * *